July 8, 1924.
1,500,414
D. MOIR ET AL
MEANS FOR THE MANUFACTURE, CENTRIFUGALLY, OF PIPES, COLUMNS, AND OTHER HOLLOW ARTICLES
Filed July 24, 1923
4 Sheets-Sheet 1
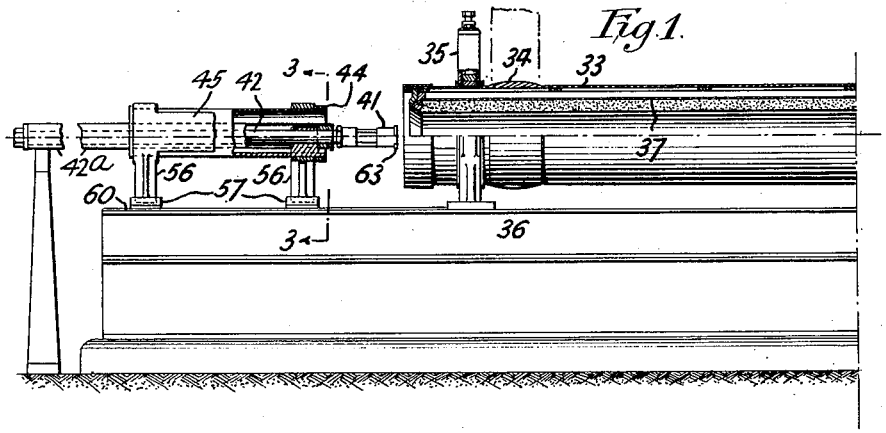
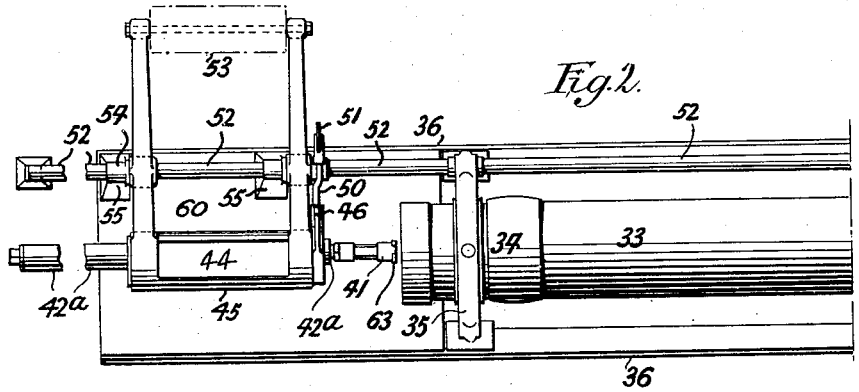
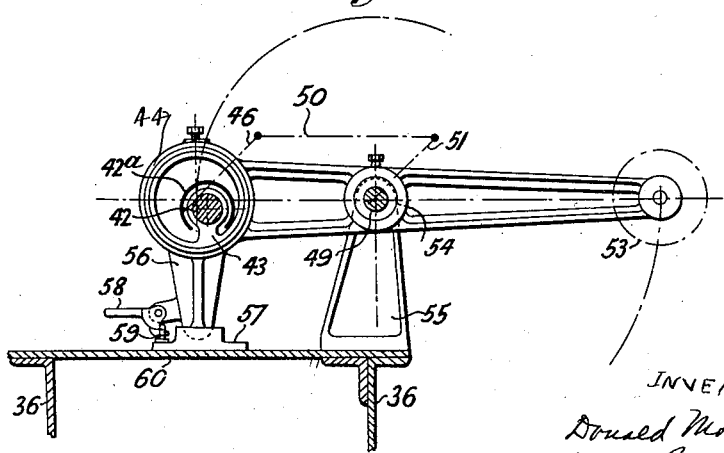

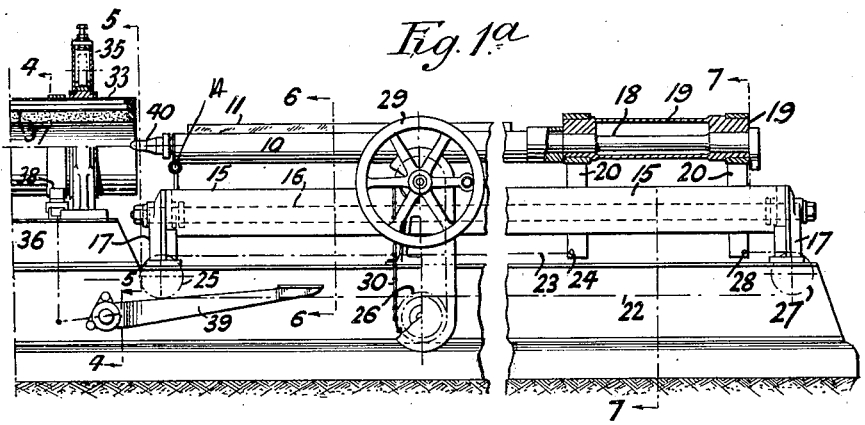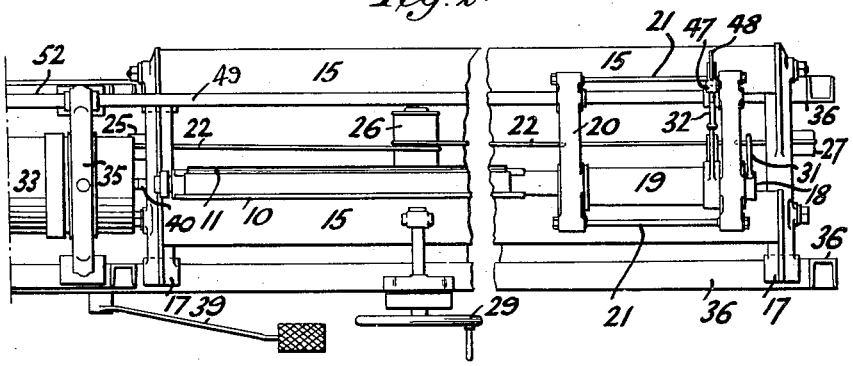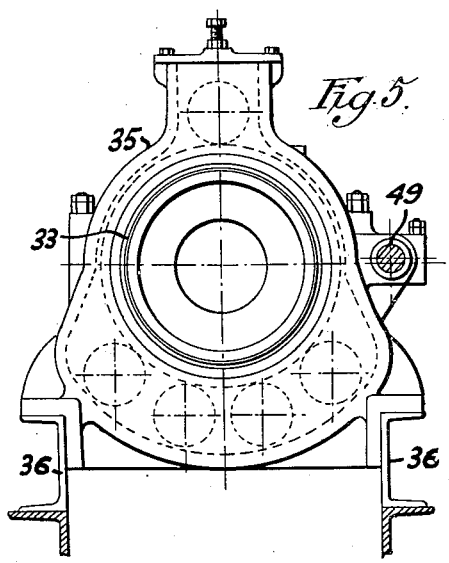

July 8, 1924.
1,500,414
D. MOIR ET AL
MEANS FOR THE MANUFACTURE, CENTRIFUGALLY, OF PIPES, COLUMNS,
AND OTHER HOLLOW ARTICLES
Filed July 24, 1923    4 Sheets-Sheet 3
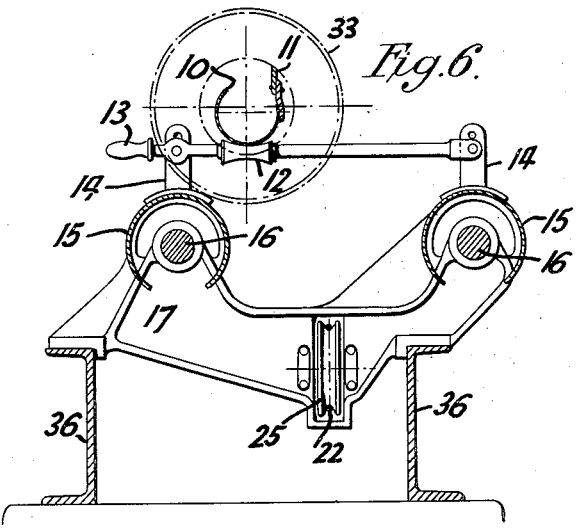
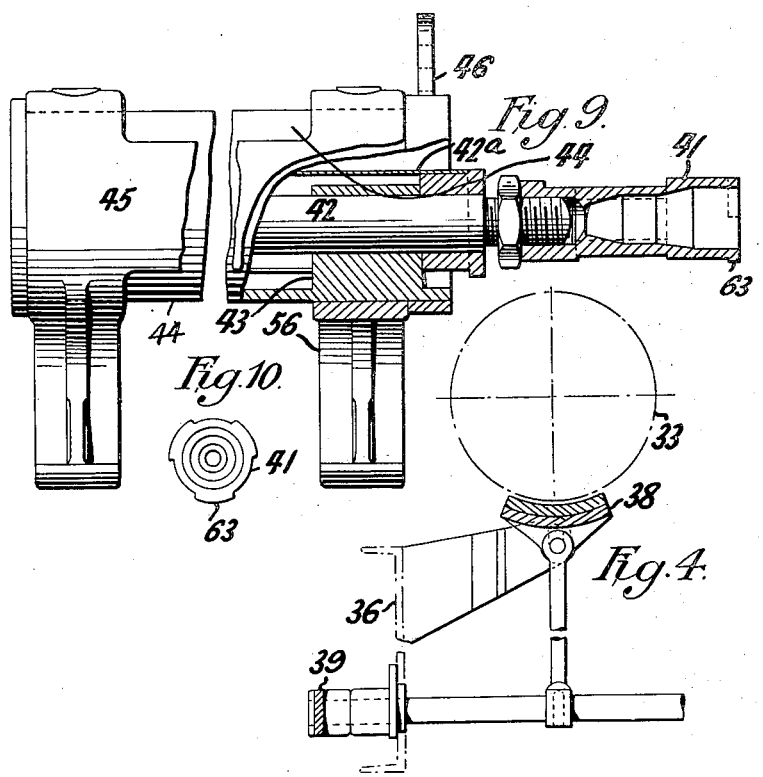

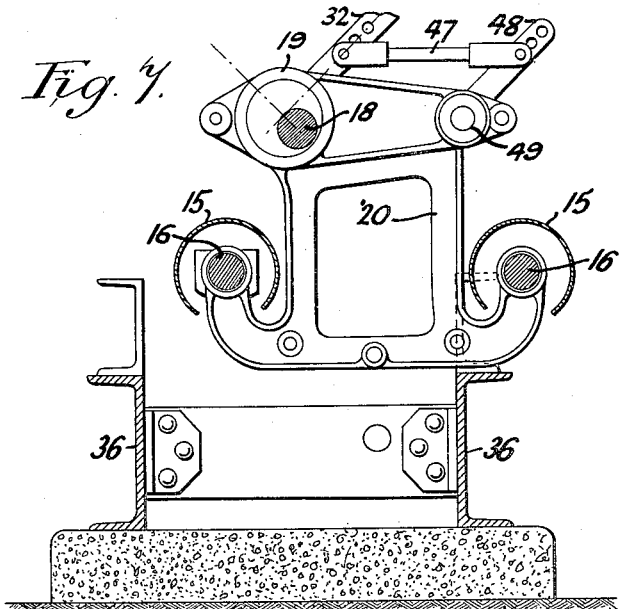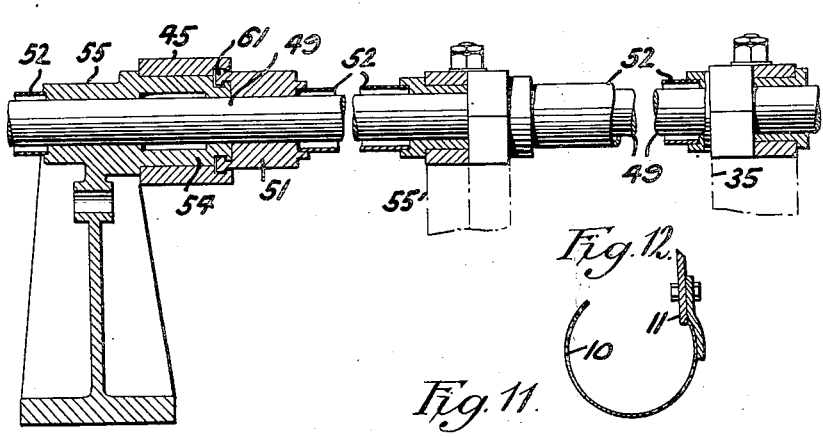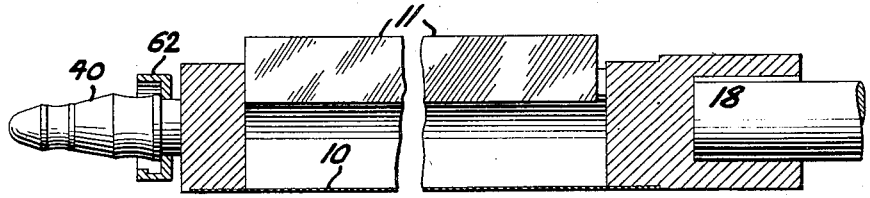

Patented July 8, 1924.

1,500,414

UNITED STATES PATENT OFFICE.

DONALD MOIR AND HUGH BUCHANAN, OF ROSARIO DE SANTA FE, ARGENTINA.

MEANS FOR THE MANUFACTURE, CENTRIFUGALLY, OF PIPES, COLUMNS, AND OTHER HOLLOW ARTICLES.

Application filed July 24, 1923. Serial No. 653,551.

*To all whom it may concern:*

Be it known that we, DONALD MOIR and HUGH BUCHANAN, subjects of the King of Great Britain and Ireland, residing, respectively, at Rosario de Santa Fe, Argentine Republic, have invented Improvements in or Relating to Means for the Manufacture, Centrifugally, of Pipes, Columns, and Other Hollow Articles, of which the following is a specification.

This invention relates to means for the manufacturing of articles centrifugally such as is set forth in the specification of Letters Patent No. 1,223,602 and No. 1,286,056, and it has for its object to provide an improved machine or apparatus which will enable lengthy pipes and other hollow ware to be produced in a more advantageous manner.

One feature of the invention consists in arranging that the trough for distributing the material of which the article is to be made is supported at both ends during the time it is introduced into the revoluble mould.

Another feature of the invention consists in arranging that whereas the trough is introduced into the mould and removed therefrom at one end the mould itself is introduced and removed at the opposite end of the casing or holder through which it is revolved.

A still further feature consists in the method of mounting a sliding support for one end of the trough in eccentric bearings which can be displaced laterally to free the entrance to the mould and which can be adjusted simultaneously with the eccentric bearings at the other end of the machine employed to enable the trough or its dressing member to be altered in position relative to the interior of the mould.

These and other minor features will be apparent from the example of machine illustrated in the accompanying drawings whereof Figs. 1 and 1ª together constitute an elevation, with parts broken away, showing the general arrangement, Figs. 2 and 2ª being corresponding plan views.

Figs. 3, 4, 5, 6 and 7 are cross sections corresponding respectively to the lines 3—3, 4—4, 5—5, 6—6 and 7—7 of Figs. 1 and 1ª. Fig. 8 is a sectional elevation of several aligned portions of Fig. 1 drawn to a larger scale but assembled more closely together. Fig. 9 is a view to a larger scale of another portion of Fig. 1 and Fig. 10 is an end view of part of Fig. 9. Fig. 11 is a view similar to Fig. 9 of a portion of Fig. 1ª and Fig. 12 is a cross section thereof.

As shown in the said drawings, the trough 10 which is partially cylindrical and has an adjustable scraper 11 is when in the position illustrated supported at its forward end by a roller 12 upon a handled cross bar 13 that can be adjusted into position upon brackets 14 carried by a pair of longitudinally slotted cover tubes 15 for two stationary guide shafts 16. The shafts 16 and cover tubes 15 are supported by frames 17 and the rear end of the trough 10 is attached to a shaft 18 mounted in an eccentric bearing sleeve 19 that in turn is carried by two frames 20 tied together by rods 21 and constituting a carriage adapted to be moved along the guide shafts 16 as by means of the rope 22, anchored at 24 to one of the carriage frames 20 and passing successively around a sheave 25, drum 26 and sheave 27 to an anchorage at 28 upon the other carriage frame 20. The rope 22 is passed two or three times around the drum 26 which can be rotated in opposite directions in any suitable way such as from the hand wheel 29 through chain and sprocket gearing 30. The turning or emptying of the trough is effected by the hand lever 31 secured to the shaft 18 and the position of the trough within the mould is determined by manipulation of the lever 32 secured to the eccentric bearing sleeve 19. The rotary part of the apparatus which per se forms no part of the present invention is shown as comprising an outer casing 33, having a rim 34 to enable it to be driven by a belt, mounted in roller containing frames 35 supported by a pair of longitudinals 36 that also carry the frames 17. The casing 33 contains the removable mould 37 and is retarded and brought to rest when required by means of a brake 38 (see Fig. 4) operated by the foot lever 39. To support the end of the trough 10 that is advanced into the mould 37, such end is provided with a head 40 adapted to be connected to a companion head 41 upon the end of a shaft 42. This shaft is free to slide in pedestals 43 Fig. 9 forming part of the interior of an eccentric bearing sleeve 44 that is mounted in a twin armed carrier 45. For the purpose of protecting the shaft 42 it is covered by a longitudinally slotted tube 42ª that moves therewith and clears the heads of the pedestals 43.

Since it is necessary that the head 41 should always be in alignment with the head 40 of the trough, the motion of the lever 32 involved in adjusting the eccentricity of the trough is transmitted simultaneously to a similar lever 46 upon the sleeve 44, the lever 32 being coupled by a link 47 to a lever 48 which is keyed to a shaft 49 movable with the carriage 20 and the lever 46 being equivalently coupled by a link 50 to a lever 51 that is splined to the shaft 49. Four stationary lengths of tubing 52 are employed to accommodate the shaft 49 when the trough 10 is advanced into the mould. To enable the mould 37 to be removed from the casing 33, the shaft 42 must be displaced laterally, to which end the carrier 45 counterbalanced by a weight at 53 is pivotally mounted upon hubs 54 of a pair of pedestals 55 so that they can be hinged thereabout, 56 being legs adapted to rest on plates 57 and normally held as by pivoted latch hooks 58 upon the legs engaging eyes 59 upon the base 60. If desired the boss of the lever 51 may be provided with a number of lateral T headed projections 61 adapted when it occupies a particular angular position to be inserted through corresponding segmental gaps in annular undercut grooves in the pedestal hub 54 and boss of the carrier 45 as shown in Fig. 8, the lever 51 when properly assembled then positioning the projections 61 so that they cannot become disengaged from the grooves aforesaid.

The heads 41 and 40 can be temporarily connected together by providing the latter with a collar 62 rotation of which completes a form of bayonet joint with projections 63 upon the head 41.

Assuming a mould 37 to be in position and the trough 10 filled, then the head 41 can be advanced by pushing in the shaft 42 and its cover tube 42ª until the head engages the trough head 40 whereupon they can be coupled. The trough 10 can then be advanced into the mould as by turning the hand wheel 29 during which time supporting advantage of the head 41 is gradually increasing just as the overhang of the trough 10 and the load due thereto is increasing. After the article is complete and the apparatus at rest, the heads 41, 40 which have been brought more nearly into coincidence with the axis of the mould, by manipulation of the lever 32, can be uncoupled and the trough withdrawn. The carrier 45 can similarly be unlatched and the shaft 42 swung upwardly to clear the entrance to the casing 33 and permit of removal of the mould and reinsertion of another.

The expression "mould" herein employed is intended to include also a hollow article to be lined.

What we claim is:—

1. Means of the kind herein referred to, comprising a hollow revoluble member, a material-distributing trough adapted to be advanced longitudinally into the said member and means for supporting the trough at both ends during the time it is being thus advanced.

2. Means of the kind herein referred to, comprising a rotary holder, a hollow member adapted to be introduced into and removed from the holder at one end thereof and a material-distributing trough adapted to be advanced longitudinally into the hollow member from the opposite end of the holder, substantially as described.

3. In means of the kind herein referred to, a material-distributing trough adapted to be moved longitudinally, a head upon one end of said trough, a longitudinally movable shaft separate from the trough, a head upon said shaft and means for temporarily coupling the heads together, substantially as described.

4. Means of the kind herein referred to, comprising a rotary holder a hollow member supported thereby, a material-distributing trough adapted to be advanced longitudinally into the hollow member, means adapted to be temporarily coupled to the end of said trough which enters the hollow member and to support the same except when the trough is withdrawn from the hollow member, and means whereby the said trough supporting means when removed from the hollow member can be laterally displaced to afford free access to the hollow member at the end of the holder remote from the trough, substantially as described.

5. In means of the kind herein referred to, a material-distributing trough, a travelling carrier therefor having an eccentric bearing arrangement in which one end of the trough is mounted, means for temporarily supporting the opposite end of the trough, an eccentric bearing arrangement for such supporting means and means whereby both eccentric bearing arrangements can be simultaneously adjusted, substantially as described.

6. In means of the kind herein referred to, a material-distributing trough, a travelling carrier therefor having an eccentric bearing arrangement in which one end of the trough is mounted, means for temporarily supporting the opposite end of the trough, an eccentric bearing arrangement for such supporting means, means whereby both eccentric bearing arrangements can be simultaneously adjusted, and means whereby the eccentric bearing arrangement for temporarily supporting one end of the trough can be laterally displaced, substantially as described.

7. In means of the kind herein referred to, a trough-supporting shaft, a bearing through which the shaft is longitudinally movable, and a pivotal carrier in which the bearing is mounted, said carrier being adapted to be swung about an axis parallel to the axis of the shaft to enable the latter to be laterally displaced, substantially as described.

8. In means of the kind herein referred to, a trough-supporting shaft, a bearing through which the shaft is longitudinally movable, a counterbalanced pivotal carrier in which the bearing is mounted, said carrier being adapted to be swung about an axis parallel to the axis of the shaft to enable the latter to be laterally displaced and means for temporarily holding the carrier against movement, substantially as described.

9. In means of the kind herein referred to, a trough, a longitudinally movable trough carrier, which the trough overhangs, means for eccentrically adjusting the trough in relation to the carrier, means for temporarily supporting the overhanging end of the trough, eccentric means for adjusting the same to agree with the eccentric adjustment of the trough aforesaid and telescopic means in association with both the eccentric adjustment means so that both can be simultaneously controlled, in any position of the trough, substantially as described.

Signed at Rosario, Argentina, by the said DONALD MOIR this 5th day of June, 1923.

DONALD MOIR.

Signed at London, England, by the said HUGH BUCHANAN this 25th day of April, 1923.

HUGH BUCHANAN.